United States Patent [19]

Hu

[11] Patent Number: 6,115,241
[45] Date of Patent: Sep. 5, 2000

[54] ATTACHMENT OF A MOBILE SCANNER TO A PORTABLE COMPUTER

[75] Inventor: Darwin Hu, San Jose, Calif.

[73] Assignee: Syscan, Inc., San Jose, Calif.

[21] Appl. No.: 09/187,848

[22] Filed: Nov. 6, 1998

[51] Int. Cl.[7] ....................................................... G06F 1/16
[52] U.S. Cl. ......................... 361/683; 361/679; 361/683; 361/686; 364/708.1
[58] Field of Search ..................... 361/679, 686, 361/683

[56] References Cited

U.S. PATENT DOCUMENTS

5,883,820  3/1999  Ota et al. ................................. 364/708

Primary Examiner—Leo P. Picard
Assistant Examiner—Yean-Hsi Chang
Attorney, Agent, or Firm—Joe Zheng

[57] ABSTRACT

A computer/scanner combination, in which a portable computer having a base and a lid, a sheet-fed scanner and a hook mounting the sheet-fed scanner to the lid of the portable computer; the hook further comprises a clip-holder removably mounted on the top of the lid and two ends removably mounted to the sheet-fed scanner.

12 Claims, 7 Drawing Sheets

ATTACHMENT OF A MOBILE SCANNER TO A PORTABLE COMPUTER

BACKGROUND OF THE INVENTION

1. Field of the Invention

The present invention generally relates to a portable scanning system and more particularly relates to a versatile attachment of a mobile scanner to a portable computer.

2. Description of the Related Art

There are many applications that need optical scanners to convert paper-based objects, such as texts and graphics, to an electronic format that can be subsequently analyzed, distributed and archived. One of the most popular optical scanners is flatbed scanners that convert scanning objects, including pictures and papers, to images that can be used, for example, for building World Wide Web pages and optical character recognition. Another popular optical scanner is what is called sheet-fed scanners that are small and unobtrusive enough to sit between a keyboard and a computer monitor or integrated into a keyboard to provide a handy scanning means. Most optical scanners are referred to as image scanners as the output thereof is generally in digital image format.

With the increasing popularity of notebook computers, there is an emerging need for scanners that are even smaller to be carried around like an accessory to the notebook computers. For example, a journalist goes far away from a news bureau to collect information about an important event somewhere. It is considerably useful if a portable or mobile scanner can be used to scan document on site into a computer that then forwards the electronic versions to the news bureau for immediate news reporting or archival. In the applications like the news reporting, handheld scanners have been used in the past. To be compact, many of the handheld scanners are manually operated, namely a user has to hold a handheld scanner over a scanning document to move from one end to another end so as to scan in the entire scanning document. However, the quality of images is not always satisfactory, typically suffering from jittered motions of the manual operations.

Figure 1:
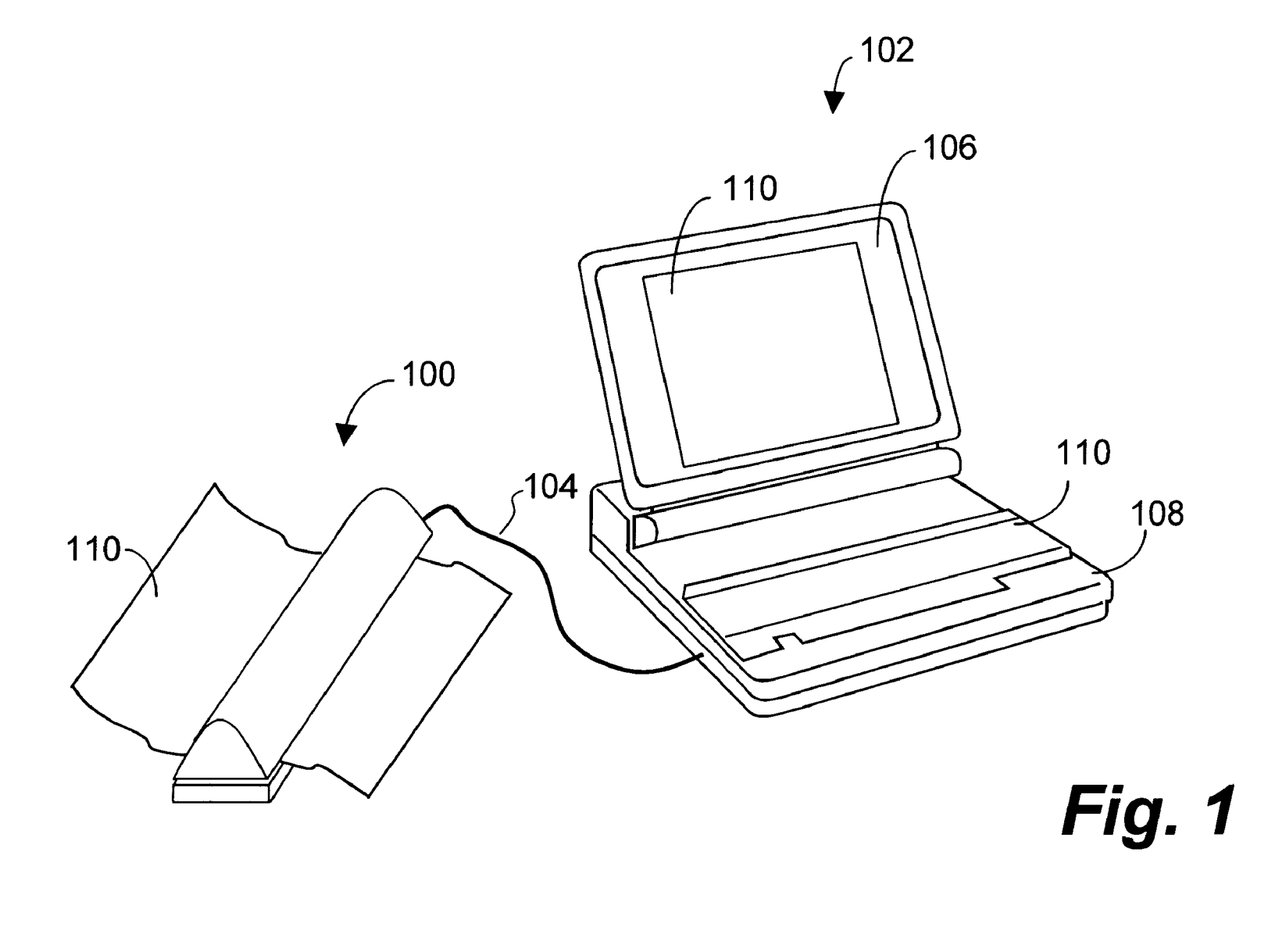
FIG. 1 illustrates a typical setting for a mobile scanner in operation with a laptop computer as a host computer.

With the emergence of sheet-fed scanners, such as those Paper Port series from Visioneer Inc., handheld scanners are gradually replaced by the sheet-fed scanners. Because a sheet-fed scanner operates automatically, namely a scanning document is well controlled to pass through an image sensor in the sheet-fed scanner, the resultant images are generally satisfactory. FIG. 1 illustrates a typical setting for a mobile scanner 100 in operation with a laptop computer 102 as a host computer. Mobile scanner 100 is connected, through a communication cable 104 to laptop computer 102 that comprises a lid 106 and base 108. Lid 106 including a screen panel 110 that can be flipped open to a suitable position so that a user can read screen panel 110 and base 108 includes main electronic parts therein and is topped with a keyboard 112.

Not really suggested by the name, laptop computer 102 or base 108 is often placed on a flat area for comfortable operation, except it requires much smaller area than a desktop computer does. However, an accessory like a mobile scanner is used together with a computer, a much large space is typically required. For example, many business people use a laptop computer on their trip, often performing tasks in an airplane, the trays in front of the chairs in the airplane are just large enough to hold a laptop computer and thus leaves no extra space for a mobile scanner. It is indeed awkward to hold a mobile scanner by one hand and operate the computer by another hand. There is therefore a long and waited need for a versatile attachment of a mobile scanner to a laptop computer, which provides easy use of the mobile scanner without interfering normal operation of the laptop computer.

SUMMARY OF THE INVENTION

The present invention has been made in consideration of the above described problems and needs. According to the principles of this invention, a combination of scanner/computer is disclosed to provide a solution to a long-felt need in the area of scanner applications. A scanner is indeed an accessory to a computer, or more precisely an image input interface to the computer. With the help of a scanner, the computer can instantly receive images of document, pictures and other graphical materials and distribute the images electronically to remote sites. However, the scanner is a physical thing that needs to be held properly in order to perform the work. In many situations in which a laptop computer is used, there is no additional space to hold the scanner.

The solution provided in the present invention can be advantageously used in the situations. Advantages and benefits of this invention can be appreciated by those skilled in the art. One immediate advantage and benefit is that the user does not have to allocate an additional space to support a portable scanner stably. The second immediate advantage and benefit is that a portable scanner can be supported to operate properly without obscuring the user's operation of the portable computer.

According to one embodiment, the present invention is a computer/scanner combination comprising:

a portable computer having a base and a lid, the lid having a first surface and a second surface;

a sheet-fed scanner;

a hook mounting the sheet-fed scanner to the first surface of the lid of the portable computer; the hook further comprising:
a clip-holder removably mounted on the top of the lid;
two ends removably mounted to the sheet-fed scanner; the ends extending respectively and integrated to the clip-holder;

wherein the portable computer is typically a laptop computer and the first surface is a cover and the second surface is a flat panel screen.

Accordingly, one of the objects in the present invention is to provide a versatile attachment of a mobile scanner to a laptop computer, which provides easy use of the mobile scanner without interfering normal operation of the laptop computer.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

According to the principles of this invention, a combination of scanner/computer is disclosed to provide a solution to a long-felt need in the area of scanner applications. A scanner is an accessory to a computer, or more precisely an image input interface to the computer. With the help of a scanner, the computer can instantly receive images of document, pictures and other graphical materials and distribute the images electronically to remote sites. However, the scanner is a physical thing that needs to be held properly in order to perform the scanning operation. In many situations in which a laptop computer is used, there is no additional space to hold the scanner. As will be appreciated in the description below, the solution provided in the present invention can be advantageously used in the situations and there is no need for the additional space to hold the scanner to avoid interfering the normal operation of the laptop computer.

Figure 2:
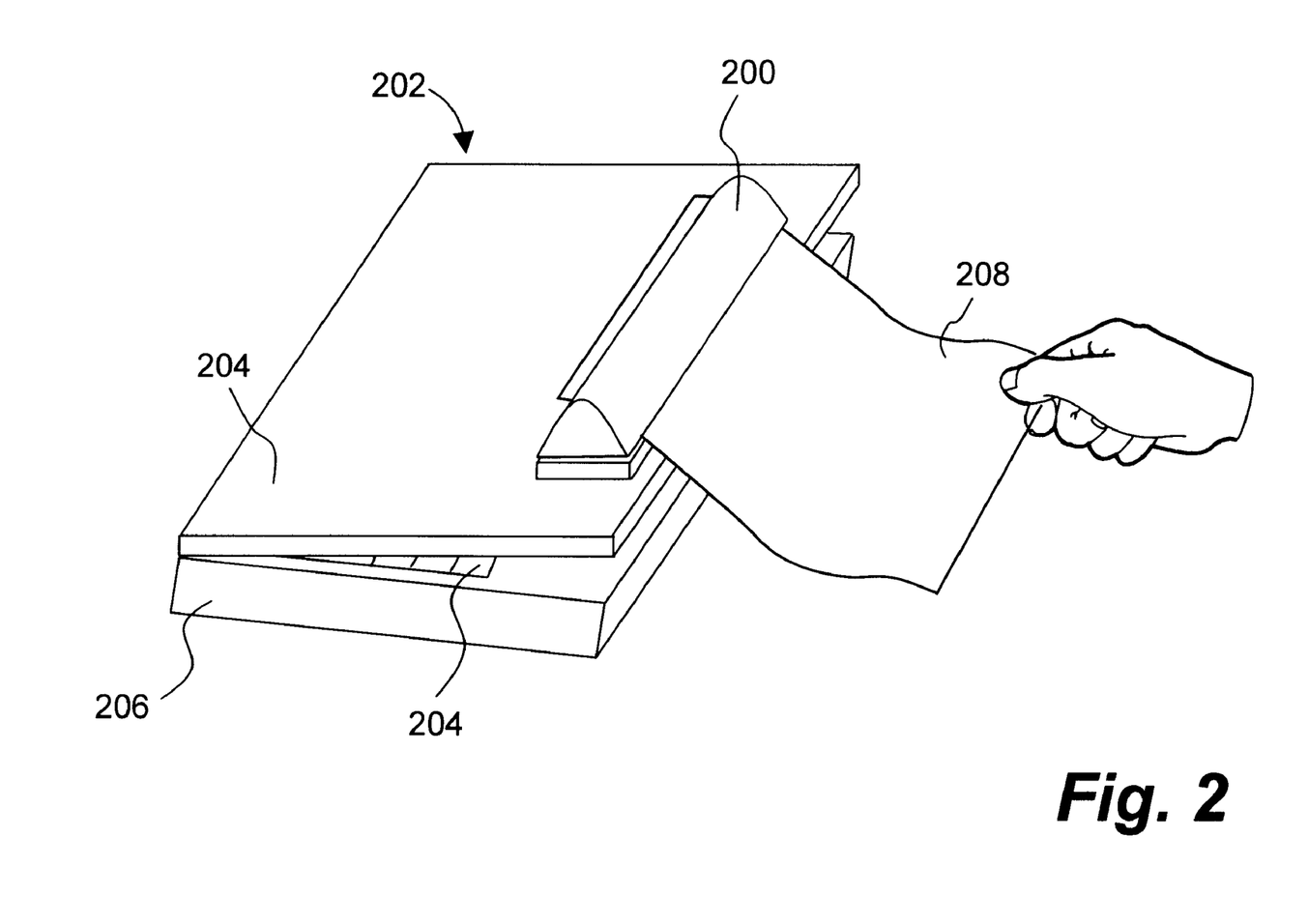
FIG. 2 shows a schematic configuration employing the present invention.

Referring now to the drawings, in which like numerals refer to like parts throughout the several views. FIG. 2 shows a schematic configuration employing the present invention. As described before, there are many situations in which a scanner operating with a host computer scans document and downloads resultant images of the document to the host computer. The host computer may be coupled to a network, such as the Internet, to send images to a remote site for publication, reports or sharing of data, etc. As shown in the figure, a portable scanner 200, which may be mobile scanner 100 in FIG. 1, is attached to a portable computer 202 that may correspond to laptop computer 102 in FIG. 1.

Portable computer 202 comprises a lid 204 and a base 206. It is generally known that lid 204 is foldable, up or down. Lid 204 comprises two surfaces, an outside side and an inside side. The outside functions as a cover of the portable computer and the inside is mainly a flat panel screen. When lid 204 is open, generally in an upright position, the flat panel screen becomes visible to the user. Base 206 of portable computer 202 is typically supported on a small table or the lap of a user. When operated on rechargeable batteries, portable computer 202 is indeed a convenient tool for the user to perform many tasks while on the move.

According the principles of the present invention, portable scanner 200 is attached to the outside of lid 204 using a versatile attaching means or hook (not shown in the figure). Attaching portable scanner 200 securely to portable scanner 200 allows the user to perform a scanning operation without physically moving portable scanner 200 around or holding portable scanner 200 by a hand. According to one embodiment, lid 204 is folded a little bit down so that the user can feed a piece of paper 208 to portable scanner 200. It is generally known that a sheet-fed scanner (having a touch sensor therein) is triggered to take in the edge of a piece of paper when the paper is inserted. Once paper 208 is taken in by scanner 200, lid 204 may be resumed to the upright position so the user can continue to work on applications that were started. When it comes to the point that an image of paper 208 is needed, the user may activate a predefined key in keyboard 210 and portable scanner 200 starts the scanning operation, namely paper 208 is caused to move through portable scanner 200.

The advantages and benefits of this invention can be appreciated by those skilled in the art. One immediate advantage and benefit is that the user does not have to allocate an additional space to support portable scanner 200 horizontally. This is a long waited solution for the user on the move. The second immediate advantage and benefit is that portable scanner 200 is supported to operate properly without obscuring the user's operation of portable computer 202.

Figure 3A:
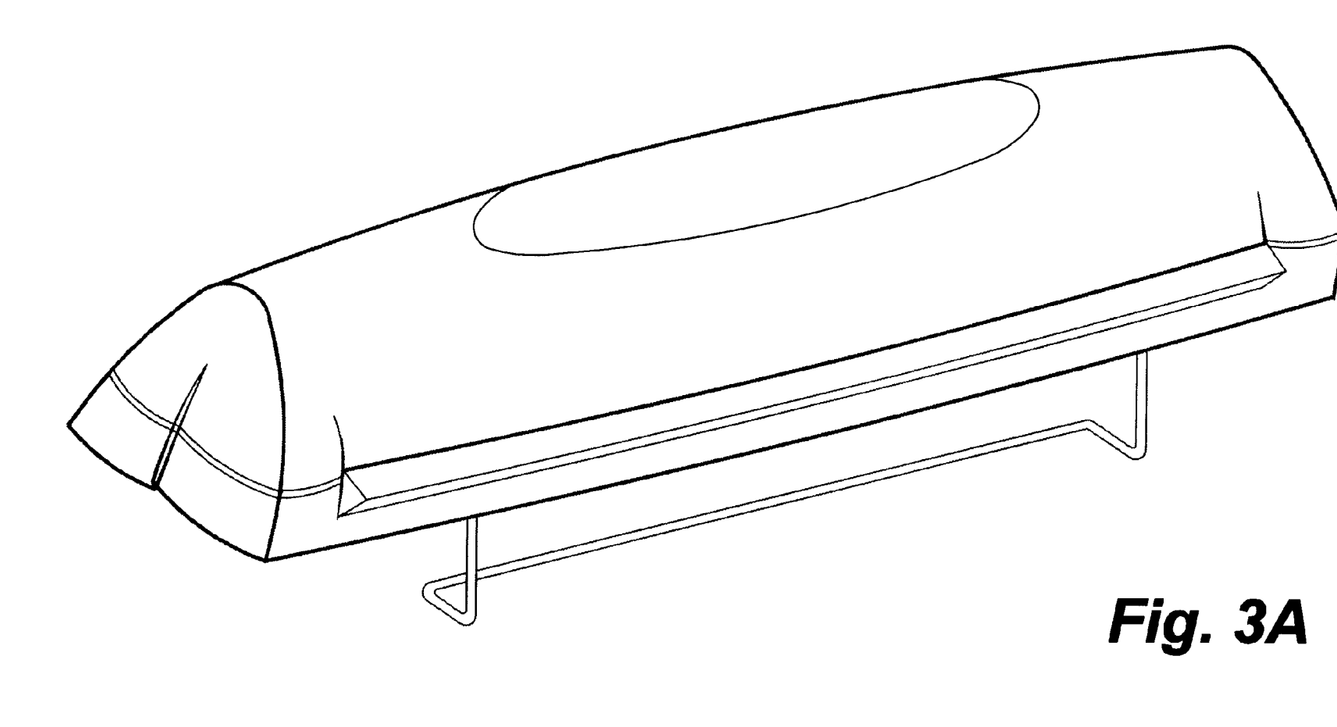
FIG. 3A demonstrates a perspective view of portable scanner mounted with a hook.
Figure 3B:
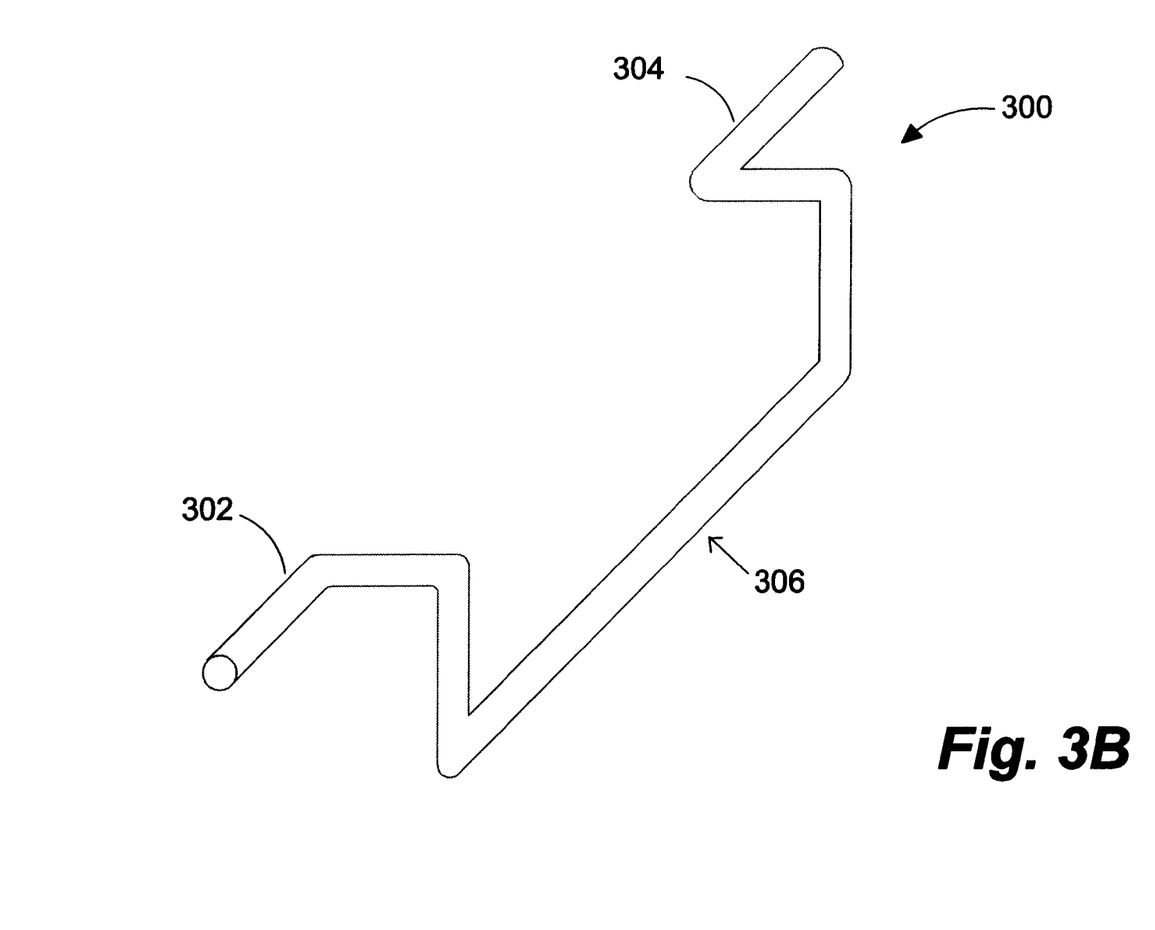
FIG. 3B illustrates a perspective view of the hook according to one embodiment.

FIG. 3A demonstrates a perspective view of portable scanner 200 mounted with hook 300. FIG. 3B illustrates a perspective view of hook 300 according to one embodiment. Hook 300 is preferably made out of a rigid material (wire), such as steel or heavy-duty plastic, and comprises two parts. The first part is a pair of ends 302 and 304 as shown in the figure, which can be removably mounted to portable scanner 200. Typically there are a pair of corresponding receptacles on one side, preferably the bottom, of portable scanner 200. Each of ends 302 and 304 is inserted into one of the receptacles so that hook 300 is held on together with scanner 200. The second part of hook 300 is clip-holder 306 that typically grasps on the edge of lid 204 of FIG. 2. According to another embodiment, hook 300 may be an elongated holder but foldable, namely ends 302 and 304 can be folded to meet together so as to reduce the elongated length of hook 300. The structure of having a folding means is well known to those skilled in the art.

Figure 3C:
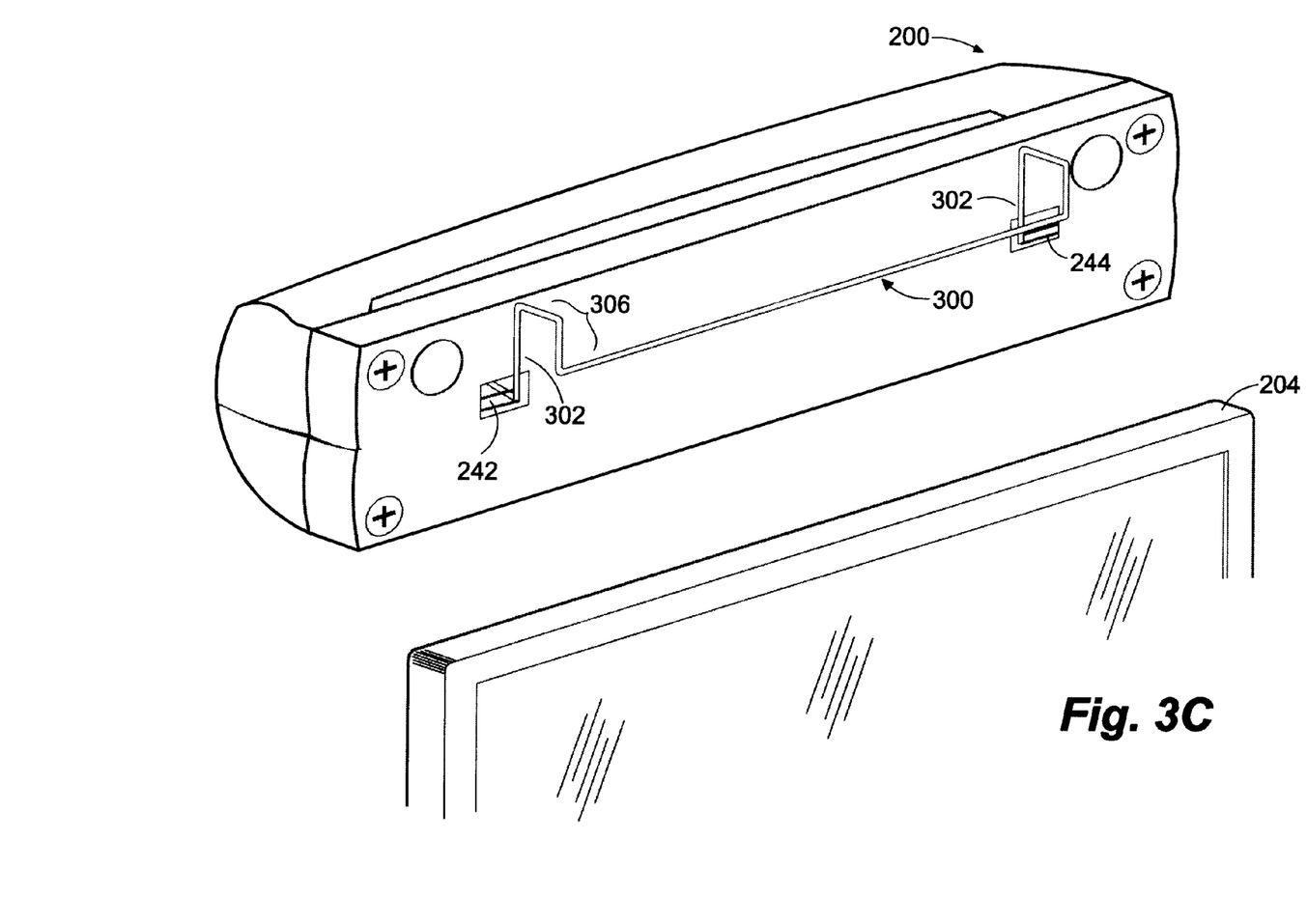
FIG. 3C shows a perspective view of the attachment of portable scanner to the outside of lid of a portable computer by hook.
Figure 3D:
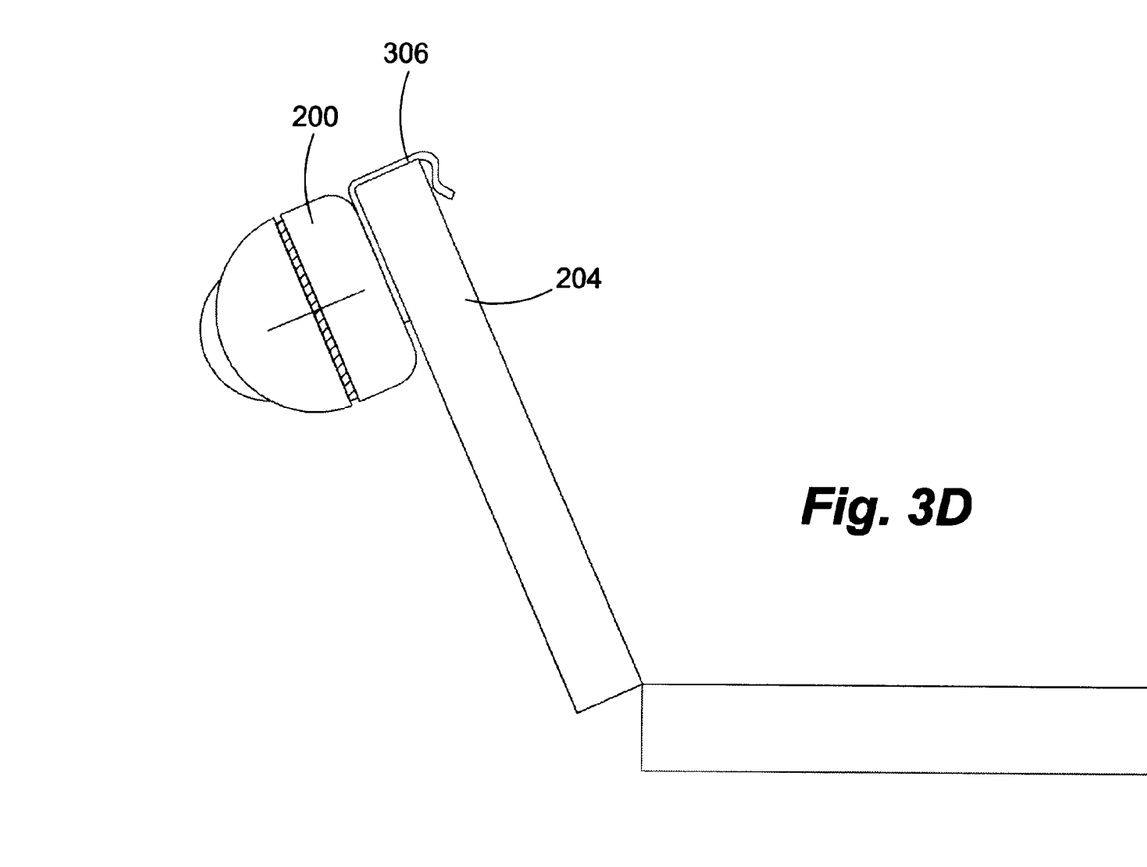
FIG. 3D shows a side view in which a portable scanner is attached to the cover side of a laptop computer.

FIG. 3C shows a perspective view of the attachment of portable scanner 200 to the outside of lid 204 of a portable computer by hook 300 and should be understood in conjunction with FIG. 2. The pair of ends 302 and 304 are respectively and removably mounted in receptacles 242 and 244 on the bottom of portable scanner 200. Clip-holder 306 is caused to grasp the edge of lid 204 so that portable scanner 200 is detachably mounted to portable computer 202. FIG. 3D shows a side view in which portable scanner 200 is detachably mounted to lid 204 of portable computer 202 by a clip-holder 306. It can be seen that attachment of a portable scanner to a portable computer through a hook ensures a secure support of the portable scanner and does not obscure the operation of the portable computer. With the embodiment of the hook as shown in FIG. 3A, lid 204 may be folded up and down without losing the scanner.

Figure 4:
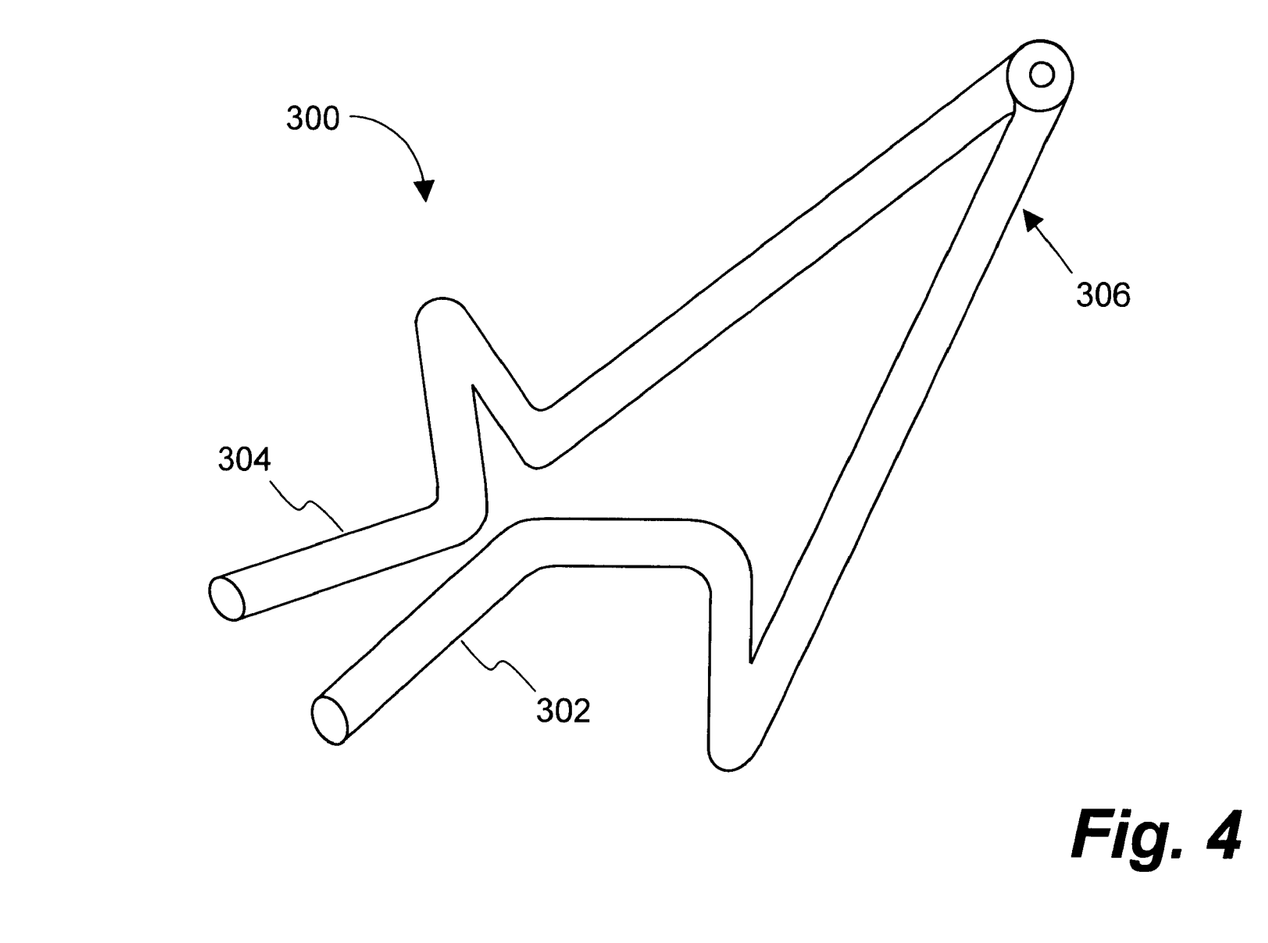
FIG. 4 shows a view in which the attachment (i.e. the hook) is in a folder position, which makes it easy for a user to carry the hook around.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, hook 300 can be made in various forms and there may be many places on portable scanner 200 that may be used to hold on hook 300. FIG. 4 shows a view in which hook 300 is in a folder position. In some embodiments, clip-holder 306 may be too long and it may be troublesome to carry around with portable scanner 200. Hence clip-holder 306 can be made foldable according to one embodiment in which two ends 302 and 304 meet together when hook 300 is in the folder position. Similarly the clip-holder can be in different forms or shapes as long as it can grasp, preferably, one side of a laptop computer. Accordingly, the scope of the present invention is defined by the appended claims rather than the forgoing description of embodiments.

I claim:

1. A computer/scanner combination, comprising:
   a portable computer having a base and a lid, said lid having a first surface and a second surface;
   a sheet-fed scanner having a bottom, said bottom having a pair of receptacles; and
   an attachment mounting said sheet-fed scanner to said first surface of said lid of said portable computer; said attachment further comprising:
   a clip-holder removably mounted on the top of said lid;
   two ends removable mounted to said sheet-fed scanner; said ends extending oppositely and integrated to said clip-holder, wherein the ends can be receptively and removably received in the receptacles.

2. The combination as recited in claim 1, wherein said first surface is a cover of said portable computer and said lid is folded open to generally an upright position while said base is generally supported horizontally and wherein said sheet-fed scanner is supported by said attachment in an upright manner.

3. The combination as recited in claim 2, wherein said second surface is a flat display panel, said display panel becoming available to a user when said lid is folded open to said upright position and wherein said user sees said display panel when said sheet-fed scanner scans a scanning document.

4. The combination as recited in claim 1, wherein said portable computer is a laptop computer.

5. The combination as recited in claim 2, wherein said attachment is made out of a rigid material.

6. A computer/scanner combination, comprising:
   a portable computer having a base and a lid, said lid having a cover side and a screen side;
   a sheet-fed scanner having a bottom, said bottom having a pair of receptacles; and
   a hook having two ends and a clip-holder; said two ends respectively and removably mounted to said pair of receptacles; said clip-holder removably mounted to said lip of said portable computer so that said sheet-fed scanner is removably attached to said portable computer.

7. The combination as recited in claim 6; wherein said portable computer is a laptop computer.

8. The combination as recited in claim 7; wherein said sheet-fed scanner is removably attached to said cover side of said lid of said computer by said hook.

9. The combination as recited in claim 8; wherein said clip-holder is an elongated holder holding said lid when being attached thereto.

10. The combination as recited in claim 9; wherein said hook is wire structured and made of a steel wire.

11. The combination as recited in claim 10; where each of said pair of receptacles has a receiving means for receiving one of said ends of said hook.

12. A computer/scanner combination, comprising:
    a portable computer having a base and a lid, said lid having a first surface and a second surface;
    a sheet-fed scanner; and
    an attachment mounting said sheet-fed scanner to said first surface of said lid of said portable computer; said attachment further comprising:
    a clip-holder removably mounted on the top of said lid;
    two ends removably mounted to said sheet-fed scanner; said ends extending respectively and integrated to said clip-holder, and
    wherein said attachment is foldable with said two ends meet together.

* * * * *